United States Patent
Azuma et al.

(10) Patent No.: US 10,654,329 B2
(45) Date of Patent: May 19, 2020

(54) AMPHIBIOUS VEHICLE

(71) Applicant: MITSUBISHI HEAVY INDUSTRIES, LTD., Tokyo (JP)

(72) Inventors: Seinosuke Azuma, Tokyo (JP); Masatsugu Monde, Tokyo (JP); Kazuo Hirota, Tokyo (JP); Takashi Matsunaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/167,105

(22) Filed: Oct. 22, 2018

(65) Prior Publication Data

US 2019/0143772 A1 May 16, 2019

(30) Foreign Application Priority Data

Oct. 26, 2017 (JP) .................. 2017-207385

(51) Int. Cl.
*B63B 1/22* (2006.01)
*B60F 3/00* (2006.01)
*B63B 1/40* (2006.01)
*B63B 39/06* (2006.01)

(52) U.S. Cl.
CPC .......... *B60F 3/0038* (2013.01); *B60F 3/0046* (2013.01); *B63B 1/22* (2013.01); *B63B 1/40* (2013.01); *B60F 3/0007* (2013.01); *B63B 39/061* (2013.01)

(58) Field of Classification Search
CPC ...... B60F 3/0038; B60F 3/0007; B60F 3/007; B63B 1/22; B63B 1/40; B63B 39/061
See application file for complete search history.

(56) References Cited

U.S. PATENT DOCUMENTS 3,589,323 A * 6/1971 Kercheval ............. B63B 39/061
114/286
6,684,807 B1 * 2/2004 Smith ...................... B63B 1/22
114/285

FOREIGN PATENT DOCUMENTS

JP 2011-235866 A 11/2011
JP 2014-108691 A 6/2014

* cited by examiner

*Primary Examiner* — Stephen P Avila
(74) *Attorney, Agent, or Firm* — Birch, Stewart, Kolasch & Birch, LLP.

(57) ABSTRACT

An amphibious vehicle includes a vehicle body; a flap supported at a lower portion in a traveling direction of the vehicle body to be able to swing in a direction in which an upper edge portion approaches and separates from the vehicle body; a support column which has a fluid actuator capable of expanding and contracting in accordance with a pressure of a working fluid to a cylinder chamber, is connected to the flap in at least a first end portion in a longitudinal direction, and performs adjustment of a swinging angle of the flap by expansion and contraction of the fluid actuator; a power source which supplies the working fluid to the cylinder chamber; and a safety valve which communicates with the cylinder chamber, and opens when an internal pressure of the cylinder chamber becomes greater than a predetermined pressure to discharge the working fluid in the cylinder chamber.

5 Claims, 3 Drawing Sheets

AMPHIBIOUS VEHICLE

CROSS-REFERENCE TO RELATED APPLICATION

Priority is claimed on Japanese Patent Application No. 2017-207385, filed Oct. 26, 2017, the content of which is incorporated herein by reference.

BACKGROUND

The present invention relates to an amphibious vehicle.

The amphibious vehicle receives resistance due to waves from a front when it navigates over the water. In order to reduce such resistance, a device called a flap is attached to a front portion of the amphibious vehicle (see, for example, Japanese Unexamined Patent Application, First Publication No. 2014-108691). The flap has a plate shape extending diagonally upward from the front portion of the amphibious vehicle. A lift is generated by providing the flap, and the amphibious vehicle receives resistance due to waves and the like.

However, if the waves are extremely large, since load acting on the flap also increases, there is a likelihood that the flap itself or a support column supporting the flap will be damaged. On the other hand, when the flap is supported by a spring and a damper to suppress the load or vibration acting on the flap, the natural frequency of the flap decreases and there is a possibility of resonance depending on the cycle of the waves.

An object of the present invention is to provide an amphibious vehicle capable of improving reliability by suppressing damage to the flap or the support column.

SUMMARY

According to a first aspect of the present invention, there is provided an amphibious vehicle which includes a vehicle body; a flap supported at a lower portion in a traveling direction of the vehicle body to be able to swing in a direction in which an upper edge portion approaches and separates from the vehicle body; a support column which has a fluid actuator capable of expanding and contracting in accordance with a pressure of a working fluid supplied to a cylinder chamber, is connected to the flap in at least a first end portion thereof in a longitudinal direction, and performs adjustment of a swinging angle of the flap by expansion and contraction of the fluid actuator; a power source which supplies the working fluid to the cylinder chamber; and a safety valve which communicates with the cylinder chamber, and opens when an internal pressure of the cylinder chamber becomes greater than a predetermined pressure to be able to discharge the working fluid in the cylinder chamber.

According to this configuration, when a predetermined load acts on the flap and the internal pressure of the cylinder chamber of the fluid actuator becomes larger than the predetermined pressure, the working fluid is discharged through the safety valve. Therefore, the fluid actuator contracts without resisting the above-described load, and the swinging angle of the flap changes. Therefore, the load on the flap is reduced, and damage to the flap and the support column can be suppressed.

According to a second aspect of the present invention, the flap according to the first aspect may have a first flap supported by the vehicle body, and a second flap supported by the first flap. The support column may include a first support column which adjusts a swinging angle of the first flap with respect to the vehicle body, and a second support column which adjusts a swinging angle of the second flap with respect to the first flap. The safety valve may communicate with a cylinder chamber of the second support column.

According to this configuration, the safety valve is provided on the second support column that supports the second flap. Thereby, when a predetermined load acts on the second flap, the working fluid in the cylinder chamber of the second support column is discharged through the safety valve. That is, the second support column contracts without resisting the above-mentioned load, and the swinging angle of the second flap is adjusted. Therefore, the load on the second flap is reduced, and damage to the second support column can be suppressed.

According to a third aspect of the present invention, the flap according to the first aspect may have a first flap supported by the vehicle body, and a second flap supported by the first flap. The support column may include a first support column which adjusts a swinging angle of the first flap with respect to the vehicle body, and a second support column which adjusts a swinging angle of the second flap with respect to the first flap. The safety valve may include a first safety valve which communicates with a cylinder chamber of the first support column and opens when the internal pressure of the cylinder chamber of the first support column becomes larger than a predetermined pressure to be able to discharge the working fluid in the cylinder chamber of the first support column, and a second safety valve which communicates with a cylinder chamber of the second support column and opens when the internal pressure of the cylinder chamber of the second support column becomes greater than a predetermined pressure to be able to discharge the working fluid in the cylinder chamber of the second support column.

According to this configuration, the first safety valve is provided in the first support column for supporting the first flap. Therefore, when a predetermined load acts on the first flap, the working fluid in the cylinder chamber of the first support column is discharged through the first safety valve. That is, the first support column contracts without resisting the above-mentioned load, and the swinging angle of the first flap is adjusted. Therefore, the load on the first flap is reduced, and damage to the first support column can be suppressed. Furthermore, according to this configuration, the safety valve is provided on the second support column that supports the second flap. Therefore, when a predetermined load acts on the second flap, the working fluid in the cylinder chamber of the second support column is discharged through the safety valve. That is, the second support column contracts without resisting the above-mentioned load, and the swinging angle of the second flap is adjusted. Therefore, the load on the second flap is reduced, and damage to the second support column can be suppressed.

According to a fourth aspect of the present invention, the support column according to any one of the first to third aspects may include an elastic member that receives a load from the flap.

According to this configuration, it is possible to resist the load acting on the support column via the flap, with the elastic force of the elastic member. Therefore, as compared with a case in which only the fluid actuator is provided, the impact force applied to the support column can be absorbed by the elastic member.

According to a fifth aspect of the present invention, the working fluid according to any one of the first to third aspects may be a compressible fluid.

According to this configuration, since the working fluid is a compressible fluid, a volume change occurs when a pressure is applied to the working fluid. The working fluid exerts a repulsive force on the basis of an amount of volume change. In other words, the working fluid can be caused to act like an elastic body. It is possible to resist the load acting on the support column via the flap, by the repulsive force.

According to a sixth aspect of the present invention, in the amphibious vehicle according to any one of the first to fifth aspects, an orifice portion may be provided in a flow path which discharges the working fluid from the cylinder chamber.

According to this configuration, since the orifice portion is provided on the flow path for discharging the working fluid, it is possible to obtain the damping effect on the basis of the flow resistance to the fluid. This makes it possible to further prevent the flap from being damaged. More specifically, it is possible to further suppress the flap from abruptly swinging and colliding with another member or being damaged.

According to the aforementioned amphibious vehicle, it is possible to provide an amphibious vehicle capable of suppressing damage to the flap or the support column to improve reliability.

DETAILED DESCRIPTION OF EMBODIMENTS

First Embodiment

Figure 1:
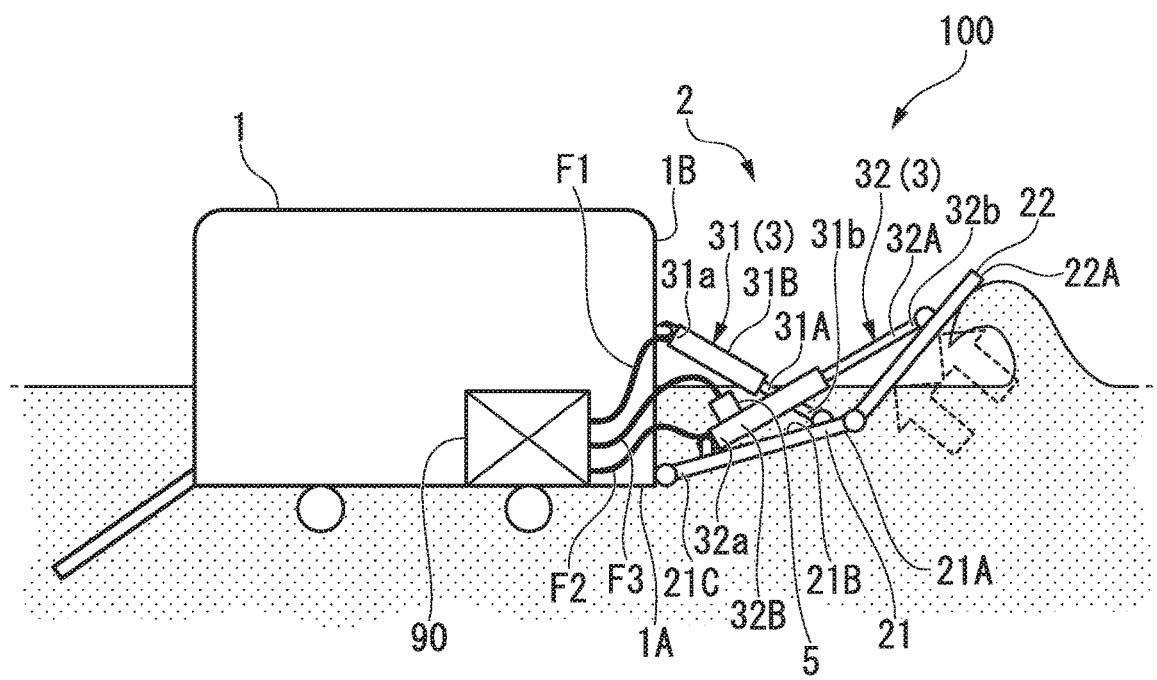
FIG. 1 is an overall view illustrating a configuration of an amphibious vehicle according to a first embodiment of the present invention.

An amphibious vehicle in the first embodiment of the present invention will be described with reference to the drawings. The amphibious vehicle 100 in this embodiment is a vehicle that can travel on water and on land. As illustrated in FIG. 1, the amphibious vehicle 100 includes a vehicle body 1, a flap 2, a support column 3, and a safety valve 5.

The vehicle body 1 has a box shape inside of which personnel, cargo, and the like can be mounted, and wheels used at the time of traveling on the land are provided on a bottom surface portion. A propulsion device (not illustrated) such as a screw used when traveling on the water is provided at a rear portion of the vehicle body 1. Further, a shape of the vehicle body 1 is not limited by this embodiment and may be other shapes such as a boat shape or the like.

When traveling on the water, the amphibious vehicle 100 receives resistance due to waves from a front side in a traveling direction. In order to reduce the resistance, the vehicle body 1 is provided with a flap 2. The flap 2 is able to swing between a deployed state in which it extends obliquely upward from a position of a front bottom surface 1A which is a lower part in the traveling direction of the vehicle body 1 and a stored state in which it is folded toward a side close to the vehicle body 1. Normally, the flap 2 is in the deployed state when traveling on the water. FIG. 1 illustrates a case in which the flap 2 is in the deployed state.

The flap 2 has a first flap 21 located on the side of the vehicle body 1, and a second flap 22 provided in front of the first flap 21. The first flap 21 has a plate shape extending forward from the front portion of the vehicle body 1. More specifically, the first flap 21 is attached to a lower portion of the front of the vehicle body 1 via a hinge, and is capable of swinging about an axis extending in a width direction of the vehicle body 1. The second flap 22 is attached to an end edge 21A of the first flap 21 on a side opposite to the vehicle body 1 via another hinge. Like the first flap 21, the second flap 22 is also capable of swinging about the axis extending in the width direction of the vehicle body 1.

In the above-described deployed state, an angle formed by the second flap 22 with respect to a horizontal plane is larger than an angle formed by the first flap 21 with respect to the horizontal plane. In other words, in the deployed state, the second flap 22 is in a posture that is more vertical than the first flap 21. That is, as compared with the first flap 21, the second flap 22 is susceptible to a load due to waves from the front side.

The support column 3 adjusts a swinging angle of the flap 2. The amphibious vehicle 100 in this embodiment has a first support column 31 which adjusts the swinging angle of the first flap 21, and a second support column 32 which adjusts the swinging angle of the second flap 22, as the support column 3.

The first support column 31 swings the first flap 21 in a direction in which the end edge 21A (in other words, an upper edge portion) of the first flap 21 approaches and separates from the vehicle body 1. In the first support column 31 in this embodiment, one end portion (a first end portion) 31a in a longitudinal direction thereof is connected to a front wall surface 1B of the vehicle body 1, and the other end portion (a second end portion) 31b is connected to the first flap 21. More specifically, the one end portion 31a of the first support column 31 is connected to substantially a central position of the front wall surface 1B in a vertical direction, and the other end portion 31b is connected to a position in the vicinity of the end edge 21A on the side opposite to the vehicle body 1 on a surface 21B of the first flap 21 facing the side of the vehicle body 1.

Figure 2:
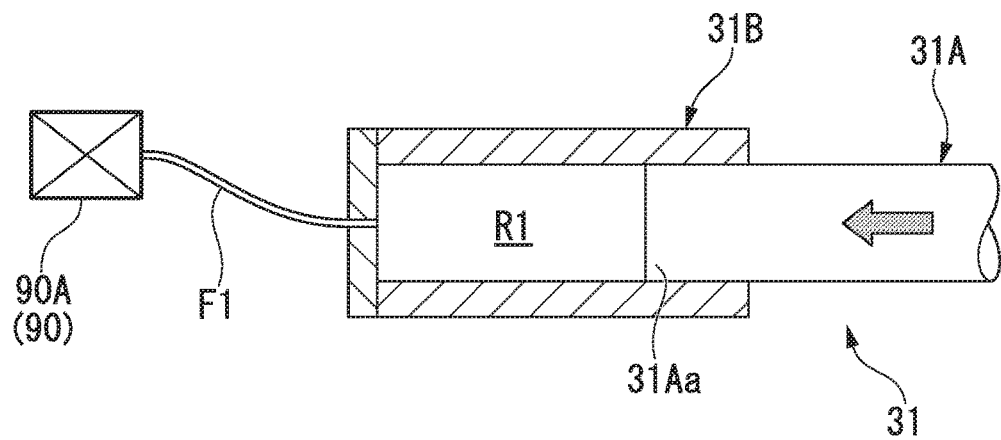
FIG. 2 is a view illustrating a configuration of a first cylinder portion and a first rod portion in the first embodiment of the present invention.

As illustrated in FIG. 2, the first support column 31 includes a first rod portion 31A and a first cylinder portion 31B. The first rod portion 31A and the first cylinder portion 31B constitute a fluid actuator of the first support column 31. A cylinder chamber R1 through which working fluid can flow is formed inside the first cylinder portion 31B, and an end portion 31Aa of the first rod portion 31A is inserted into the cylinder chamber R1. The first rod portion 31A moves forward and backward according to the fluid pressure in the cylinder chamber R1 of the first cylinder portion 31B. In other words, the first support column 31 is adapted to expand and contract as the first rod portion 31A moves forward and backward in the extending direction of the first support column 31 with respect to the first cylinder portion 31B. Here, the first support column 31 contracts when the first flap 21 is in the stored state and expends when the first flap 21 is in the deployed state.

The first cylinder portion 31B is connected to a power source 90A via a first flow path H. The working fluid can be supplied from the power source 90A to the cylinder chamber R1. Here, the working fluid may be fluid other than oil, for example, a compressible fluid such as air or nitrogen gas may be used.

The second support column 32 swings the second flap 22. The second support column 32 exemplified in this embodiment is connected to the first flap 21 and the second flap 22, and swings the second flap 22 with respect to the first flap 21. More specifically, one end portion 32a of the second support column 32 is connected to the vicinity of the end edge 21C of the first flap 21 on the vehicle body 1 side, and the other end portion 32b of the second support column 32 is connected to the vicinity of an end edge 22A of the second flap 22 on the side opposite to the vehicle body 1.

Figure 3:
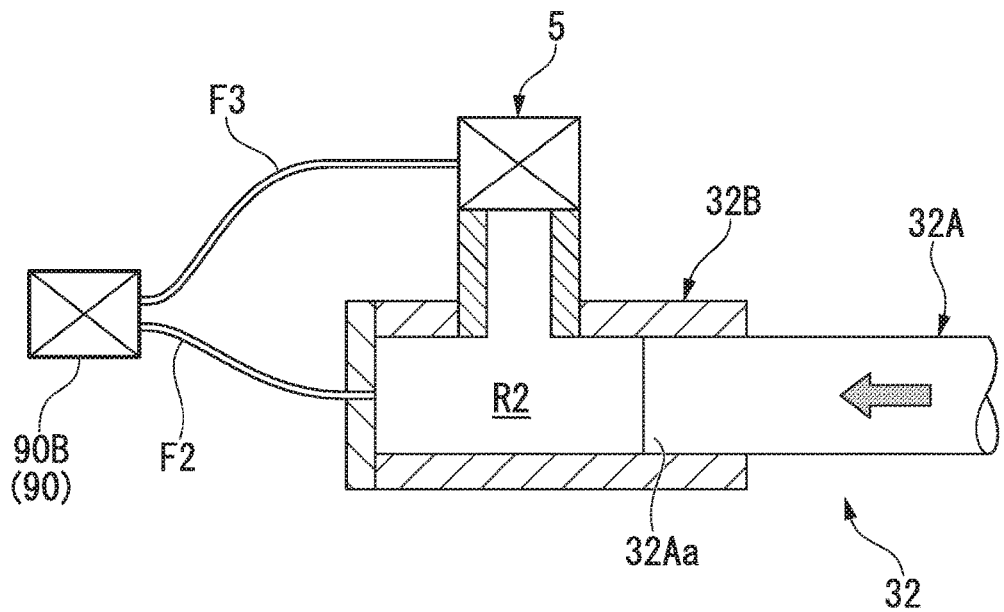
FIG. 3 is a view illustrating a configuration of a second cylinder portion, a second rod portion, and a safety valve in the first embodiment of the present invention.

As illustrated in FIG. 3, the second support column 32 includes a columnar second rod portion 32A, and a second cylinder portion 32B connected to the second rod portion 32A. The second rod portion 32A and the second cylinder portion 32B constitute a fluid actuator of the second support column 32. A cylinder chamber R2 through which the working fluid can flow is formed inside the second cylinder portion 32B. An end portion 32Aa of the second rod portion 32A is inserted into the cylinder chamber R2, and the second rod portion 32A moves forward and backward according to the liquid pressure in the cylinder chamber R2. In other words, the second support column 32 expands and contracts as the second rod portion 32A moves forward and backward in the extending direction of the second support column 32 with respect to the cylinder chamber R2 of the second cylinder portion 32B. Here, the second support column 32 expands when the second flap 22 is in the stored state and contracts when the second flap 22 is in the deployed state.

The second cylinder portion 32B is connected to the power source 90B via a second flow path F2. The working fluid can be supplied from the power source 90B to the cylinder chamber R2. Here, the working fluid may be other than oil and, for example, a compressible fluid such as air or nitrogen gas may be used.

The safety valve 5 is disposed to communicate with the cylinder chamber R2 and opens when the internal pressure of the cylinder chamber R2 becomes higher than a predetermined pressure to discharge the working fluid in the cylinder chamber R2 to the outside of the cylinder chamber R2. The safety valve 5 exemplified in this embodiment is connected to the power source 90B via a third flow path F3 so that the working fluid discharged to the outside is returned to the power source 90B. Further, a connection point of the third flow path F3 is not limited to the power source 90. For example, a drain tank opened to the atmosphere may be used.

For example, when a load is applied to the second flap 22 due to waves and the like, the second rod portion 32A is pressed in a direction in which the second rod portion 32A is retracted into the second cylinder portion 32B by the second flap 22. Then, the pressure of the working fluid in the cylinder chamber R2 rises. At this time, when the pressure of the working fluid in the cylinder chamber R2 exceeds the predetermined pressure, the safety valve 5 opens. That is, the working fluid in the cylinder chamber R2 is discharged toward the power source 90B through the third flow path F3.

When the safety valve 5 is opened in this manner, the pressure in the cylinder chamber R2 of the second cylinder portion 32B does not rise, and the second support column 32 is in a contractible state. Here, when the safety valve 5 is not opened, the pressure of the working fluid in the cylinder chamber R2 increases or decreases depending on the load applied to the second flap 22 or the second support column 32. A "predetermined pressure" at which the aforementioned safety valve 5 operates is set so that the load applied to the second flap 22 or the second support column 32 does not exceed load capacity thereof.

Next, the operation of the flap 2 of the amphibious vehicle 100 in this embodiment will be described. When the amphibious vehicle 100 is traveling on the water, a resistance due to waves from the front side occurs in the vehicle body 1. In order to reduce such resistance, the flap 2 is set in the deployed state as described above. By setting the flap 2 in the deployed state, lift occurs in the vehicle body 1, and the resistance caused by the waves is reduced.

On the other hand, when the waves from the front side are extremely large, a large load is applied to the flap 2. In particular, the second flap 22 located on the foremost side receives a larger load than the first flap 21. When a large load is applied to the second flap 22, there is a possibility that the second support column 32 that supports the second flap 22 may be unable to withstand the load and be damaged. However, in this embodiment, the cylinder chamber R2 of the second support column 32 communicates with the safety valve 5 as described above. Therefore, when the second flap 22 receives a load due to waves from the front and the pressure in the cylinder chamber R2 is about to become larger than the predetermined value, the safety valve 5 opens and the pressure in the cylinder chamber R2 rises. Therefore, the second support column 32 enters a state in which it is capable of contracting in the longitudinal direction without resisting the load, and the upper end edge 22A of the second flap 22 swings in a direction approaching the vehicle body 1.

Therefore, according to the first embodiment, when a predetermined load acts on the flap 2 (the second flap 22) and the internal pressure of the cylinder chamber R2 of the second support column 32 becomes larger than the predetermined pressure, the working fluid is discharged through the safety valve 5. Therefore, the second support column 32 contracts without resisting the above-described load, and the swinging angle of the second flap 22 changes. Therefore, the load applied to the second flap 22 and the second support column 32 is reduced, and damage to the second flap 22 and the second support column 32 can be suppressed. As a result, the reliability of the amphibious vehicle 100 can be improved.

In a case in which the working fluid is a compressible fluid such as air, the volume of the working fluid changes when pressure is applied to the working fluid. Therefore, when the working fluid is a compressible fluid such as air, the impact force (load) from the waves is absorbed by the amount of the volume change, which makes it possible to further suppress the second flap 22 and the second support column 32 from being damaged.

The first embodiment of the present invention has been described above. It should be noted that various alterations and modifications can be made to the above-described structure without departing from the gist of the present invention. For example, the connection position at which the first support column 31 and the second support column 32 are connected to the flap 2, and the connection position to be connected to the vehicle body 1 may be connection positions other than those described above. Furthermore, although the case in which the first flap 21 and the second flap 22 are provided has been described, a single flap 2 corresponding to the second flap 22 may be supported by the vehicle body 1 in a swingable manner. Further, the shapes of the first support column 31, the second support column 32, the vehicle body 1, and the like are not limited to those illustrated in the drawings (the same applies to the second and subsequent embodiments).

Second Embodiment

Next, a second embodiment of the present invention will be described with reference to the drawings. The same parts as those of the first embodiment are denoted by the same reference numerals, and a detailed description thereof will not be provided.

Figure 4:
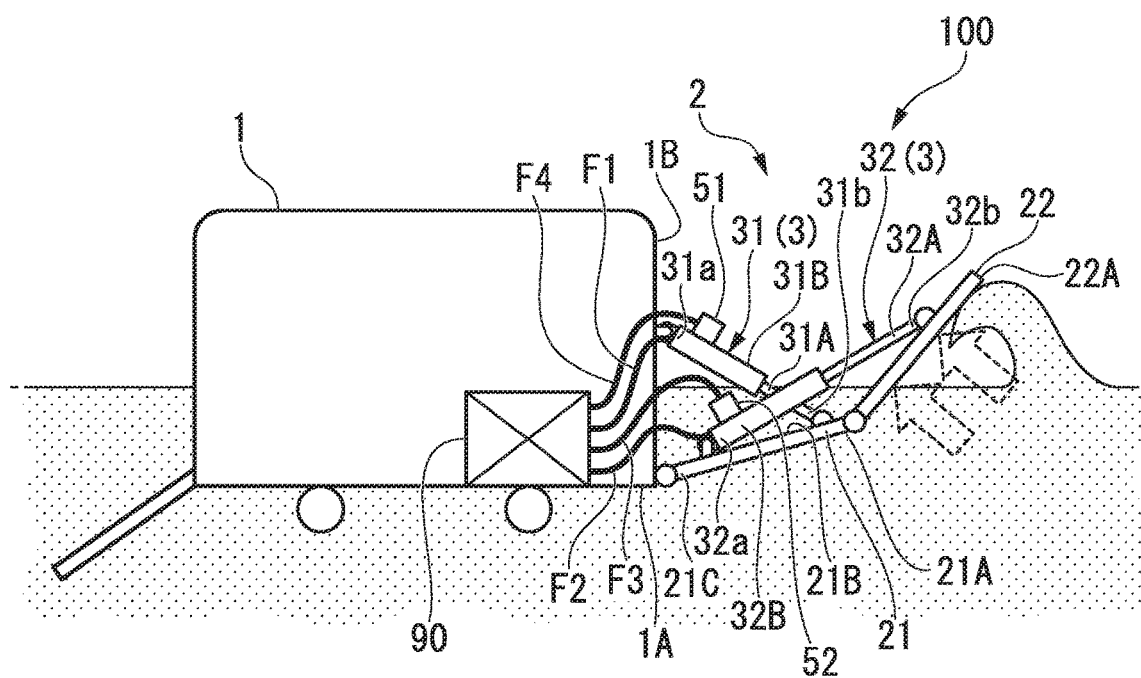
FIG. 4 is an overall view corresponding to FIG. 1 illustrating a configuration of an amphibious vehicle in a second embodiment of the present invention.

As illustrated in FIG. 4, in an amphibious vehicle 100 according to this embodiment, the safety valve 5 is also provided in the first support column 31 in addition to the second support column 32. Here, the safety valve 5 provided in the first support column 31 is referred to as a first safety valve 51, and the safety valve 5 provided in the second support column 32 is referred to as a second safety valve 52.

The configuration of the second safety valve 52 is similar to that of the safety valve 5 (see FIG. 2) in the first embodiment. The first safety valve 51 communicates with the cylinder chamber R1, is connected to the power source 90 (specifically, the power source 90A) via a fourth flow path F4, and opens when the pressure of the working fluid in the cylinder chamber R1 of the first support column 31 becomes larger than a predetermined value.

For example, when a load due to waves and the like acts on the first flap 21, the pressure of the working fluid in the cylinder chamber R1 of the first support column 31 increases. When the pressure in the cylinder chamber R1 exceeds a predetermined pressure due to the pressure rise of the working fluid, the first safety valve 51 opens, and the working fluid in the cylinder chamber R1 is discharged to the power source 90A through the fourth flow path F4. When the first safety valve 51 opens in this manner, the pressure in the cylinder chamber R1 of the first cylinder portion 31B does not rise, and the first support column 31 enters a contractible state, like the second support column 32. The aforementioned "predetermined pressure" at which the first safety valve 51 operates is set so that the load that is applied to the first flap 21 and the first support column 31 does not exceed load capacity thereof.

According to this configuration, the first safety valve 51 communicates with the cylinder chamber R1 of the first support column 31, and the second safety valve 52 communicates with the cylinder chamber R2 of the second support column 32. Therefore, when a load acts on the first flap 21 or the second flap 22, the pressure of the working fluid rises, and the pressure in the cylinder chambers R1 and R2 exceeds a predetermined pressure, the working fluid in the cylinder chamber R1 of the first support column 31 is discharged via the first safety valve 51, and the working fluid in the cylinder chamber R2 of the second support column 32 enters a state in which it is capable of being discharged through the second safety valve 52. As a result, the first support column 31 or the second support column 32 contracts without resisting the load. That is, it is possible to suppress damage to the first flap 21, the second flap 22, the first support column 31, and the second support column 32. Therefore, it is possible to provide the highly reliable amphibious vehicle 100.

The second embodiment of the present invention has been described above. It should be noted that various alterations and modifications can be made to the above-described structure without departing from the gist of the present invention.

Third Embodiment

Next, a third embodiment of the present invention will be described with reference to the drawings. The same parts as in the above embodiments are denoted by the same reference numerals, and a detailed description thereof will not be provided.

Figure 5:
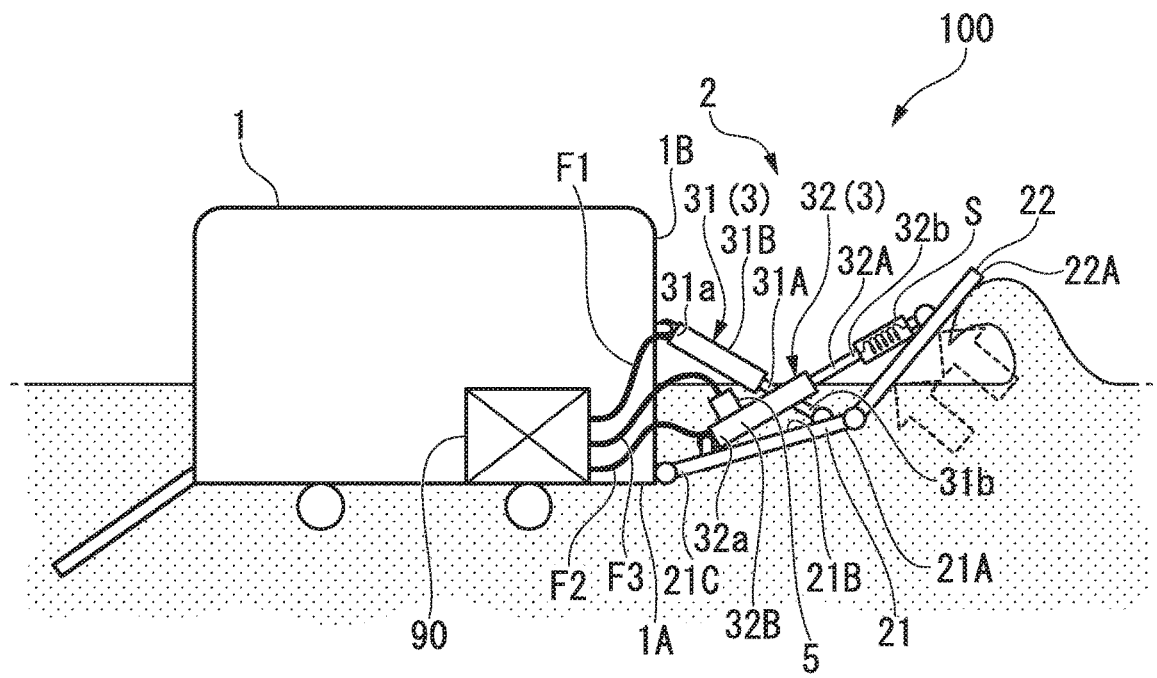
FIG. 5 is an overall view corresponding to FIG. 1 illustrating a configuration of an amphibious vehicle in a third embodiment of the present invention.

As illustrated in FIG. 5, in this embodiment, a spring S (an elastic member) is provided. The spring S is disposed, for example, in series with the second rod portion 32A. For the spring S, a compression coil spring that elastically deforms under load from both end portions can be used. FIG. 5 is a schematic view illustrating the operation of the spring S. An arrangement of the spring S is not limited to the arrangement illustrated in FIG. 5. For example, the spring S can be accommodated inside the second support column 32. In this embodiment, it is also possible to use a so-called incompressible working fluid such as oil as a working fluid.

According to this configuration, when the load due to the waves acting on the second flap 22 increases and the safety valve 5 operates, the spring S elastically deforms in the compression direction. That is, as compared with a case in which only the safety valve 5 is provided, a force against the impact force of the waves acting on the second flap 22 can be applied by the spring S. Therefore, for example, the swinging speed of the second flap 22 can be suppressed.

In addition, since an initial load (impact force) applied to the second flap 22 by the spring S can be absorbed, it is possible to use a so-called incompressible working fluid such as oil as the working fluid of the second support column 32. Therefore, the second support column 32 can be expanded and contracted with smaller energy. It is desirable to set a spring constant of the spring S to such a degree that it elastically deforms more easily and quickly than the contraction of the second support column 32 when the second flap 22 receives a load.

The third embodiment of the present invention has been described above. It should be noted that various alterations and modifications can be made to the above-described structure without departing from the gist of the present invention. For example, the configuration in which the spring S is provided only on the second support column 32 has been described in the aforementioned third embodiment, but the spring S may also be provided on the first support column 31. In addition, the spring S may be a member that can be compressed and deformed, and is not limited to a coil spring.

Modified Example of Third Embodiment

Furthermore, a damper (not illustrated) that exerts a damping force can also be provided in parallel to the aforementioned spring S. The damper may be configured to be accommodated on an inner peripheral side of the spring S. Further, the damper may be accommodated inside the second support column 32 similarly to the spring S. When a load is received, the damper exerts a damping force proportional to a displacement speed (swinging speed) of the second flap 22 due to the load. According to such a configuration, the swinging speed of the second flap 22 can be promptly reduced by the damping force of the damper. That is, even in a case in which the load due to the waves sharply changes accompanying an impulse-like spike, the rapid swinging of the second flap 22 can be suppressed. Thus, even when a large load is repeatedly applied to the second flap 22, it is possible to avoid an occurrence of fatigue fracture or the like in the second flap 22 and the second support column 32.

Fourth Embodiment

Next, a fourth embodiment of the present invention will be described with reference to FIG. 6. The same parts as in the above embodiments are denoted by the same reference numerals, and a detailed description thereof will not be provided.

Figure 6:
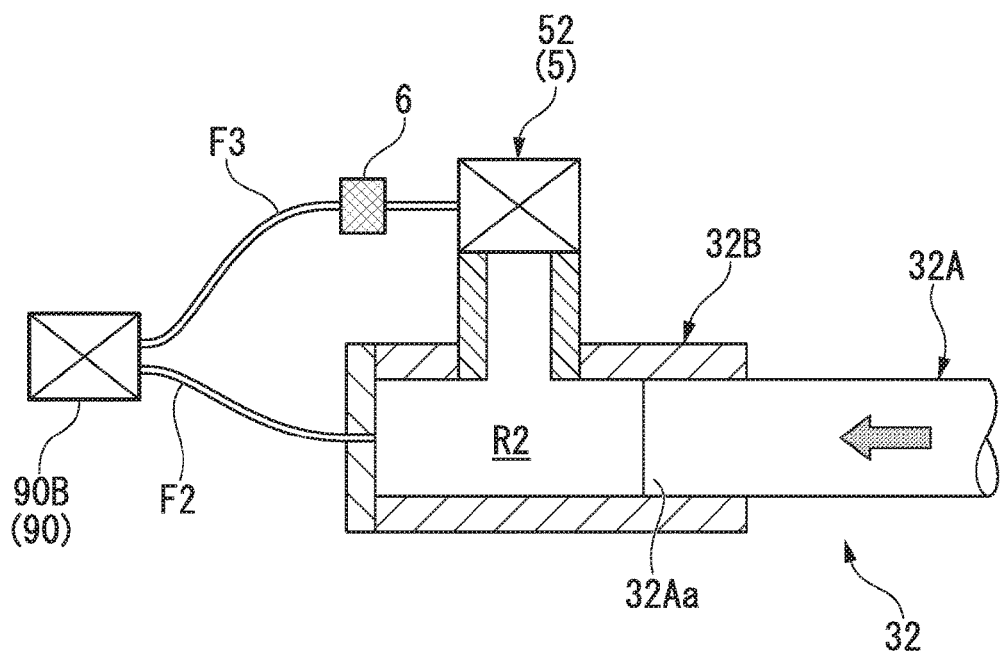
FIG. 6 is a view corresponding to FIG. 3 illustrating an arrangement of orifice portions in a fourth embodiment of the present invention.

As illustrated in FIG. 6, in this embodiment, an orifice portion 6 is provided on the third flow path F3 which connects the second safety valve 52 and the power source 90. The orifice portion 6 is a narrowed portion in which a flow path diameter is set to be relatively smaller than other portions in the third flow path F3.

A larger flow resistance is generated in the working fluid passing through the orifice portion 6 as compared with the working fluid passing through other portions. It is possible to suppress the flow rate of the working fluid in the third flow path F3 from rapidly rising, by the flow resistance of the orifice portion 6. In other words, the flow of the working fluid is attenuated. Therefore, for example, when the second safety valve 52 is opened, a decrease in the pressure in the cylinder chamber R2 of the second cylinder portion 32B becomes gentle. Therefore, it is possible to suppress the second flap 22 from swinging more than necessary.

According to this configuration, since the orifice portion 6 is provided on the third flow path F3 through which the working fluid flows, it is possible to impart a large flow resistance to the working fluid. As a result, it is possible to suppress the second flap 22 and the second support column 32 from being damaged by the reaction caused by opening of the second safety valve 52.

The fourth embodiment of the present invention has been described above. It should be noted that various alterations and modifications can be made to the above-described structure without departing from the gist of the present invention. For example, the configuration in which the orifice portion 6 is provided only in the third flow path F3 has been described in the fourth embodiment. However, it is also possible to provide the orifice portion 6 in the fourth flow path F4 (see FIG. 4). Further, the orifice portion 6 may be used in combination with the spring S of the third embodiment. When the spring S is combined, the vibration of the spring S can be attenuated with the damping force of the orifice portion 6.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Vehicle body
2 Flap
3 Support column
5 Safety valve
6 Orifice portion
21 First flap
22 Second flap
31 First support column
31A First rod portion (fluid actuator)
31B First cylinder portion (fluid actuator)
32 Second support column
32A Second rod portion (fluid actuator)
32B Second cylinder portion (fluid actuator)
51 First safety valve
52 Second safety valve
90 Power source
100 Amphibious vehicle
F1 First flow path
F2 Second flow path
F3 Third flow path
F4 fourth flow path
S Spring

What is claimed is:

1. An amphibious vehicle comprising:
a vehicle body;
a flap supported at a lower portion in a traveling direction of the vehicle body to be capable of swing in a direction in which an upper edge portion approaches and separates from the vehicle body;
a support column which has a fluid actuator capable of expanding and contracting in accordance with a pressure of a working fluid supplied to a cylinder chamber, is connected to the flap in at least a first end portion in a longitudinal direction, and performs adjustment of a swinging angle of the flap by expansion and contraction of the fluid actuator;
a power source which supplies the working fluid to the cylinder chamber;
a safety valve which communicates with the cylinder chamber, and opens when an internal pressure of the cylinder chamber becomes greater than a predetermined pressure to be able to discharge the working fluid in the cylinder chamber, wherein
the flap has a first flap supported by the vehicle body, and a second flap supported by the first flap,
in a deployed state of the flap, an angle formed by the second flap with respect to the horizontal plane is equal to or larger than an angle formed by the first flap with respect to the horizontal plane,
the support column includes
a first support column which adjusts a swinging angle of the first flap with respect to the vehicle body, and
a second support column which adjusts a swinging angle of the second flap with respect to the first flap, and
the safety valve communicates with a cylinder chamber of the second support column.

2. An amphibious vehicle comprising:
a vehicle body;
a flap supported at a lower portion in a traveling direction of the vehicle body to be capable of swing in a direction in which an upper edge portion approaches and separates from the vehicle body;
a support column which has a fluid actuator capable of expanding and contracting in accordance with a pressure of a working fluid supplied to a cylinder chamber, is connected to the flap in at least a first end portion in a longitudinal direction, and performs adjustment of a swinging angle of the flap by expansion and contraction of the fluid actuator;

a power source which supplies the working fluid to the cylinder chamber; and a safety valve which communicates with the cylinder chamber, and opens when an internal pressure of the cylinder chamber becomes greater than a predetermined pressure to be able to discharge the working fluid in the cylinder chamber wherein the flap has a first flap supported by the vehicle body, and a second flap supported by the first flap, the support column includes a first support column which adjusts a swinging angle of the first flap with respect to the vehicle body, and a second support column which adjusts a swinging angle of the second flap with respect to the first flap, and the safety valve includes a first safety valve which communicates with a cylinder chamber of the first support column and opens when the internal pressure of the cylinder chamber of the first support column becomes larger than a predetermined pressure to be able to discharge the working fluid in the cylinder chamber of the first support column, and a second safety valve which communicates with a cylinder chamber of the second support column and opens when the internal pressure of the cylinder chamber of the second support column becomes greater than a predetermined pressure to be able to discharge the working fluid in the cylinder chamber of the second support column.

3. The amphibious vehicle according to claim 1, wherein the support column comprises an elastic member which receives a load from the flap.

4. The amphibious vehicle according to claim 1, wherein the working fluid is a compressible fluid.

5. The amphibious vehicle according to claim 1, wherein an orifice portion is provided in a flow path which discharges the working fluid from the cylinder chamber.

* * * * *